(12) United States Patent
van der Gaast et al.

(10) Patent No.: US 7,653,396 B2
(45) Date of Patent: Jan. 26, 2010

(54) METHOD FOR ASSIGNING UPLINK AND/OR DOWNLINK CAPACITIES BASED ON AVAILABLE CAPACITY

(75) Inventors: Tjietse van der Gaast, Huizen (NL); Geert Jan Hoekstra, Amersfoort (NL); Franciscus Josephus Maria Panken, Bussum (NL); Jeroen van Bemmel, Leiden (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 476 days.

(21) Appl. No.: 11/204,194

(22) Filed: Aug. 15, 2005

(65) Prior Publication Data

US 2007/0036113 A1  Feb. 15, 2007

(51) Int. Cl.
*H04B 7/216* (2006.01)
*H04Q 7/20* (2006.01)

(52) U.S. Cl. ....................... 455/450; 370/342

(58) Field of Classification Search ............... 370/237, 370/328, 236.1, 231, 230.1; 455/450; 340/342
See application file for complete search history.

(56) References Cited

U.S. PATENT DOCUMENTS

| 6,717,932 B1 * | 4/2004 | Blanc et al. ............... 370/342 |
| 2005/0026621 A1 * | 2/2005 | Febvre et al. ............... 455/450 |

FOREIGN PATENT DOCUMENTS

| EP | 0 912 015 A2 | 10/1998 |
| EP | 1 509 012 A2 | 8/2004 |
| WO | WO 01/31861 A1 | 5/2001 |
| WO | WO0131861 A1 * | 5/2001 |
| WO | WO 02/063798 A1 | 8/2002 |

OTHER PUBLICATIONS

PCT Search Report from PCT/US2006/030544 dated Feb. 22, 2007.

* cited by examiner

*Primary Examiner*—William D Cumming
(74) *Attorney, Agent, or Firm*—Williams, Morgan & Amerson, PC (57) ABSTRACT

A method is provided for use in communication involving first and second parties. The method includes determining a first capacity associated with a first channel of a communication link between the first and second parties. The method also includes assigning a second capacity to a second channel of the communication link based on the first capacity and a third capacity associated with at least the first and second channels.

19 Claims, 5 Drawing Sheets

METHOD FOR ASSIGNING UPLINK AND/OR DOWNLINK CAPACITIES BASED ON AVAILABLE CAPACITY

BACKGROUND OF THE INVENTION

1. Field of the Invention

This invention relates generally to communication systems and, more particularly, to assigning uplink and/or downlink capacities in communication systems.

2. Description of the Related Art

Parties in a conventional communication system typically exchange signals over a channel that is divided into an uplink channel and a downlink channel. One example of a conventional wired communication system is a Digital Subscriber Line (DSL). A DSL system, such as Asymmetric DSL, provides high-speed data connectivity over a local loop or a final mile of the communication network. The DSL connection includes an uplink and a downlink channel. Subscribers to the DSL system contract for a selected uplink capacity and a selected downlink capacity. For example, a subscriber to the DSL system may contract for an uplink capacity of 1 Mbps and a downlink capacity of 8 Mbps.

Conventional wireless communication systems include one or more access points, which may also be referred to as base stations or node-Bs, for providing wireless connectivity to one or more access terminals, which may also be referred to using terms such as user equipment, subscriber equipment, and mobile units. Exemplary access terminals include cellular telephones, personal data assistants, smart phones, text messaging devices, laptop computers, desktop computers, and the like. Each access point may provide wireless connectivity to one or more access terminals, such as the access terminals in a geographical area, or cell, associated with the access point. For example, an access point may provide wireless connectivity to access terminals located in a "hot spot" according to an IEEE 802.11 protocol, such as a WiFi protocol. Alternatively, the access point may provide wireless connectivity to access terminals located in the hot spot according to an IEEE 802.16 protocol, a Bluetooth protocol, and or other protocols.

In operation, an access terminal maintains a wireless communication link, or leg, with an access point. The wireless communication link typically includes an uplink for transmitting information from the access terminal to the access point and a downlink for transmitting information from the access point to the access terminal. The downlink may also be referred to as a forward link and the uplink may be referred to as a reverse link. The capacity of the wireless communication link is typically shared by the uplink and the downlink between the access terminal and the access point, as well as by uplinks and/or downlinks associated with other access terminals. Thus, the capacity of the wireless communication link is often a scarce resource. Portions of the available uplink capacity and/or the downlink capacity may therefore be assigned to the wireless communication link between the access terminal and the access point. For example, a capacity of 10 Gbps may be assigned to the uplink and a capacity of 10 Gbps may be assigned to the downlink.

The wired and/or wireless communication systems use a variety of techniques to enforce the agreed-upon capacity limits for the uplink and/or the downlink. For example, a DSL system may simply drop transmissions in excess of the contracted uplink and/or downlink capacities. For another example, if an access point in a wireless communication system receives information that would need to be transmitted at a capacity of more than the contracted downlink capacity to the access terminal on the downlink, the access point may only transmit information to the access terminal at or below the contracted downlink capacity and choose to ignore, or drop, surplus traffic in excess of the agreed-upon downlink capacity limit. For yet another example, if an access terminal attempts to transmit more than the contracted uplink capacity to the access point on the uplink, the access point may choose to ignore, or drop, surplus traffic in excess of the agreed-upon uplink capacity limit. Dropping surplus traffic is sometimes referred to as "traffic policing."

Policing traffic based on the separate uplink and downlink capacity limits may reduce the efficiency of wired and/or wireless communication links. For example, conventional traffic policing techniques cannot adaptively change the uplink and/or downlink capacity limits. Accordingly, if a first party in the network is transmitting information to a second party over the downlink at more than the agreed-upon downlink capacity and the second party is transmitting information to the first party over the uplink at much less than the agreed-upon uplink capacity, the conventional traffic policing technique may drop surplus downlink traffic, even though capacity associated with the uplink may be available. Furthermore, even if the uplink and downlink capacity limits could be determined adaptively, variations in the demand for uplink and/or downlink capacity over time could cause a mismatch between the demand for uplink and/or downlink capacity, as well as the allocated ratio of uplink-to-downlink capacity. Responsibility for policing the uplink or downlink traffic in conventional traffic policing schemes rests with the community of users affected by the surplus traffic, and not the device that transmits the surplus traffic.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for use in communication involving first and second parties. The method includes determining a first capacity associated with a first channel of a communication link between the first and second parties. The method also includes assigning a second capacity to a second channel of the communication link based on the first capacity and a third capacity associated with at least the first and second channels.

In another embodiment of the present invention, a method is provided for use in communication involving first and second parties. The method may include determining a first capacity of an uplink channel of a communication link between the first and second parties based on a second capacity associated with a downlink channel of the communication link and a third capacity associated with the uplink and downlink channels of the communication link. The method also includes accessing information to be transmitted over the uplink channel at a fourth capacity and dropping a portion of the accessed information if the fourth capacity exceeds the first capacity.

In yet another embodiment of the present invention, a method is provided for use in communication involving first and second parties. The method may include determining a first capacity of a downlink channel of a communication link between the first and second parties based on a second capacity associated with an uplink channel of the communication link and a third capacity associated with the uplink and downlink channels of the communication link. The method may also include accessing information to be transmitted over the downlink channel at a fourth capacity and dropping a portion of the accessed information if the fourth capacity exceeds the first capacity.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
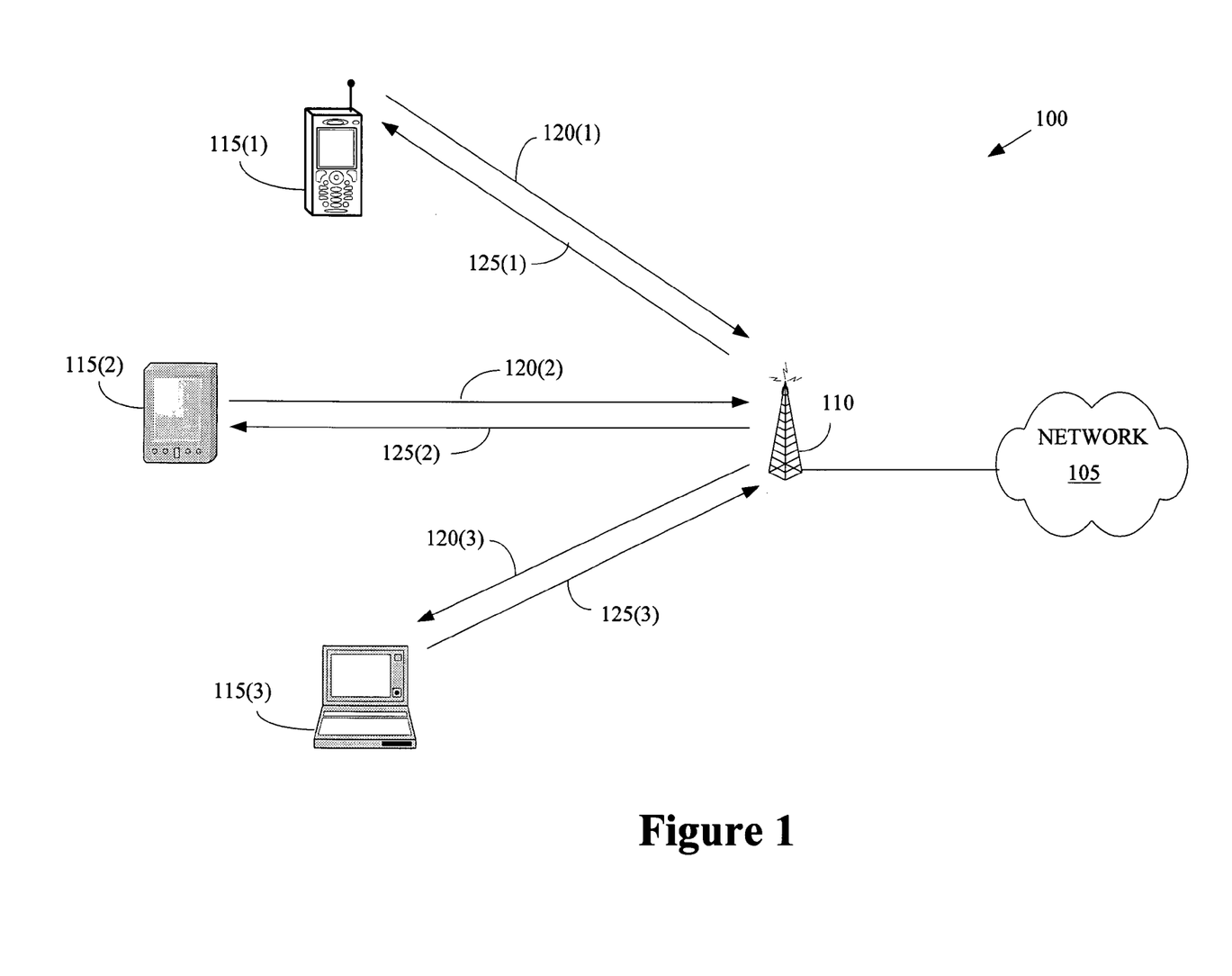
FIG. 1 conceptually illustrates one exemplary embodiment of a communication system, in accordance with the present invention.

Referring now to FIG. 1, one exemplary embodiment of a communication system 100 is shown. In the illustrated embodiment, the communication system 100 includes a wireless network 105 that is communicatively coupled to an access point 110. However, persons of ordinary skill in the art having benefit of the present disclosure should appreciate that the wireless network 105 may be coupled to any number of access points 110. Although the present invention will be discussed below in the context of the wireless network 105, persons of ordinary skill in the art having benefit of the present disclosure should also appreciate the present invention is not limited to the wireless network 105. In alternative embodiments, the network 105 may be any desirable wired network, wireless network or combination thereof. For example, the network 105 may be a wired network that may be used by parties to communicate over uplink and/or downlink channels of the wired network. For example, the network 105 may be a Digital Subscriber Line (DSL) network that allows a modem to communicate with a DSL server over uplink and/or downlink channels of the DSL network.

The wireless network 105 and the access point 110 provide wireless connectivity according to one or more wireless communication protocols. In the illustrated embodiment, the access point 110 provides wireless connectivity according to an IEEE 802.11 (e.g., a Wireless Fidelity or WiFi) protocol. However, persons of ordinary skill in the art having benefit of the present disclosure should appreciate that the present invention is not limited to these exemplary wireless communication systems. In alternative embodiments any desirable wireless communication system may be used to provide wireless connectivity. Exemplary wireless communication systems include a Universal Mobile Telecommunication Systems (UMTS), a Global System for Mobile communications (GSM), a Code Division Multiple Access (CDMA or CDMA 2000) system, an Evolution, Data Only (EVDO) system, an IEEE 802.16 system, a Bluetooth system, and the like. Furthermore, the wireless network 105 and/or the access point 110 may, in alternative embodiments, include wired connections that operate according to one or more wired communication systems.

The communication system 100 includes one or more access terminals 115(1-3). In the interest of clarity, the indices (1-3) will be used when the access terminals 115(1-3) are referred to individually or in subsets, but the indices (1-3) may be dropped when the access terminals 115 are referred to collectively. The same convention may be applied to other numbered elements referred to below. Exemplary access terminals 115 include, but are not limited to, mobile phones, personal data assistants, smart phones, text messaging devices, laptop computers, desktop computers, and the like. In the interest of clarity, only three access terminals 115 are shown in FIG. 1. However, persons of ordinary skill in the art having benefit of the present disclosure should appreciate that the communication system 100 may include any desirable number of access terminals 115.

The access terminals 115 may form wireless communication links with the wireless network 105 over air interfaces that include an uplink 120(1-3) and a downlink 125(1-3). In various embodiments, the uplinks 120 and/or the downlinks 125 may be established according to any protocol including, but not limited to, the exemplary wireless communication system protocols discussed above. In the illustrated embodiment, the air interfaces between the access point 110 and the access terminals 125 have an associated capacity, which may be measured in bits, bytes, packets (e.g., for fixed packet sizes), and the like. The associated capacity may be determined according to a contract between the access point 110 and the access terminals 125. The contract may be negotiated prior to forming the air interface, at the time the air interface is formed, or during operation of the air interface. For example, the air interface may include a wireless communication channel having a total available capacity of 10 Mbps. The communication channel may be defined by a frequency, a time slot, a channelization code, any combination thereof, or by any other technique.

The total available capacity of the air interface may be shared by the uplinks 120 and the downlinks 125. Accordingly, in one embodiment, capacity may be assigned to the uplinks 120 and/or the downlinks 125 based on the available capacity of the air interface, as well as other factors. For example, the access point 110 may be maintaining a queue of information to be transmitted to the access terminal 115(1) over the downlink 125(1) and the access terminal 115(1) may have little or no information available to transmit to the access point 110 over the uplink 125(1). A relatively large portion of the capacity of the air interface may therefore be assigned to the downlink 125(1) and a relatively small portion of the capacity of the air interface may be assigned to the uplink 120(1), e.g., a relatively large ratio of the downlink capacity to the uplink capacity may be assigned. Persons of ordinary skill in the art having benefit of the present disclosure should also appreciate that other air interface capacities may be used to assign the uplink and/or downlink capacities. For example, capacities may be assigned to one or more uplinks 120 and/or downlinks 125 based on the available capacity associated with more than one of the air interfaces between the access point 110 and the access terminals 115.

Figure 2:
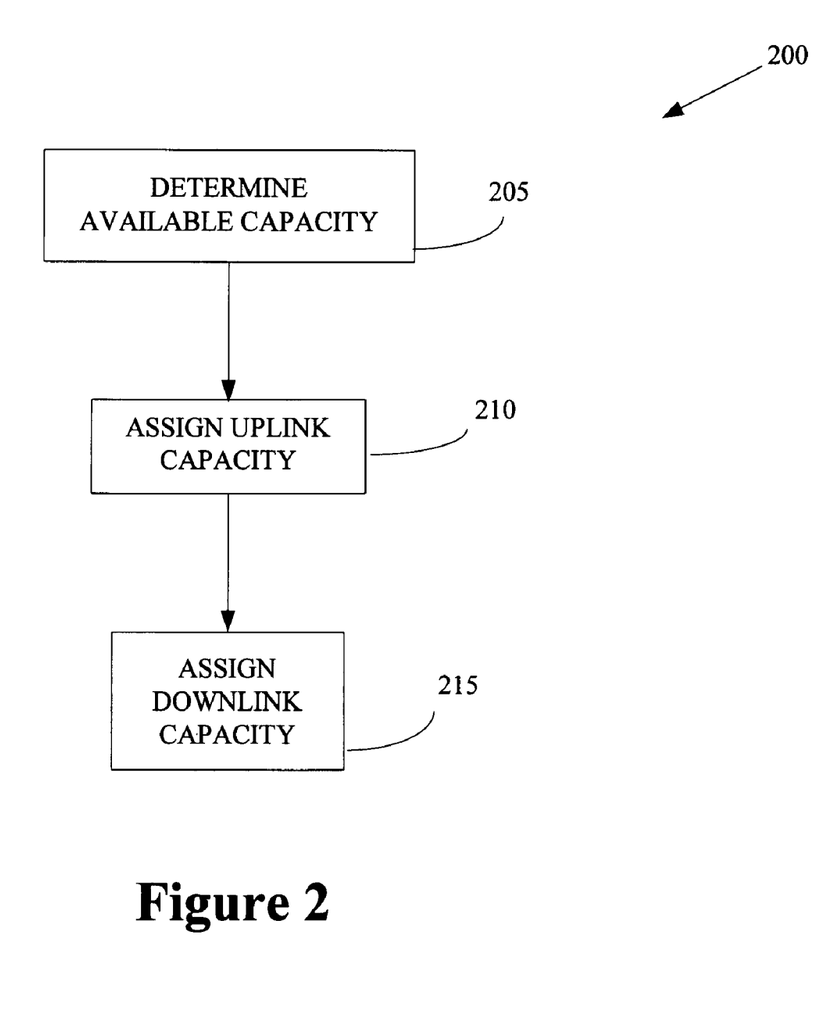
FIG. 2 conceptually illustrates one embodiment of a method for assigning uplink capacity and/or downlink capacity based on an available capacity, in accordance with the present invention.

FIG. 2 conceptually illustrates one embodiment of a method 200 for assigning uplink capacity and/or downlink capacity based on an available capacity. In the illustrated embodiment, a first party, such as the access point 110 shown in FIG. 1, and a second party, such as the access terminal 115(1) shown in FIG. 1, may communicate over a communication channel including an uplink channel and a downlink channel, such as the uplink 120(1) and the downlink 125(1) shown in FIG. 1. The available capacity is determined (at 205). In one embodiment, the available capacity is a total capacity associated with the communication channel. The associated capacity may be determined according to a contract negotiated between the first and second parties. For example, the first and second parties may negotiate a total (or maximum) capacity of about 10 Mps. However, in alternative embodiments, the available capacity may include capacity associated with more communication channels, such as a bundle of wired and/or wireless communication links.

In one embodiment, determining (at 205) the available capacity may also include defining additional parameters that represent maximum and/or minimum capacities for upstream and/or downstream traffic. For example, a minimum capacity in the upstream and/or downstream direction may be determined (at 205), at least in part to avoid situations where the first and/or second parties have no upstream and/or downstream capacity left for any transmission. A maximum capacity in the upstream and/or downstream direction may also be determined (at 205), at least in part to avoid situations where the first or the second party captures all of the upstream and/or downstream capacity. In one embodiment, the maximum and/or minimum capacities may be determined (at 205) to take into account possible capacity restrictions in other parts of the network.

Uplink and/or downlink capacities may be assigned (at 210 and/or 215) based on the available capacity. For example, the available capacity (as negotiated by the first and second parties) may be approximately 10 Mbps and approximately equal uplink and/or downlink capacities of about 5 Mbps may be assigned (at 210 and 215). However, persons of ordinary skill in the art should appreciate that the uplink and/or downlink capacities may be independently assigned (at 210 and 215) at different times and different capacities may be assigned (at 210 and/or 215) to each channel. Alternatively, the uplink or downlink capacity may be assigned based on a measurement of the other capacity. For example, the uplink capacity may be assigned (at 210 and/or 215) so that it is less than or approximately equal to the difference between the available capacity and the measured downlink capacity. For another example, the downlink capacity may be assigned so that it is less than or approximately equal to the difference between the available capacity and the measured uplink capacity.

In one embodiment, capacities may be assigned (at 210 and/or 215) to the uplink and/or downlink at predetermined time intervals. Capacities may also be assigned (at 210 and/or 215) based on other factors, such as a number of users, a current load, a traffic shape, statistical multiplexing of traffic streams of different users, and the like.

Figure 3:
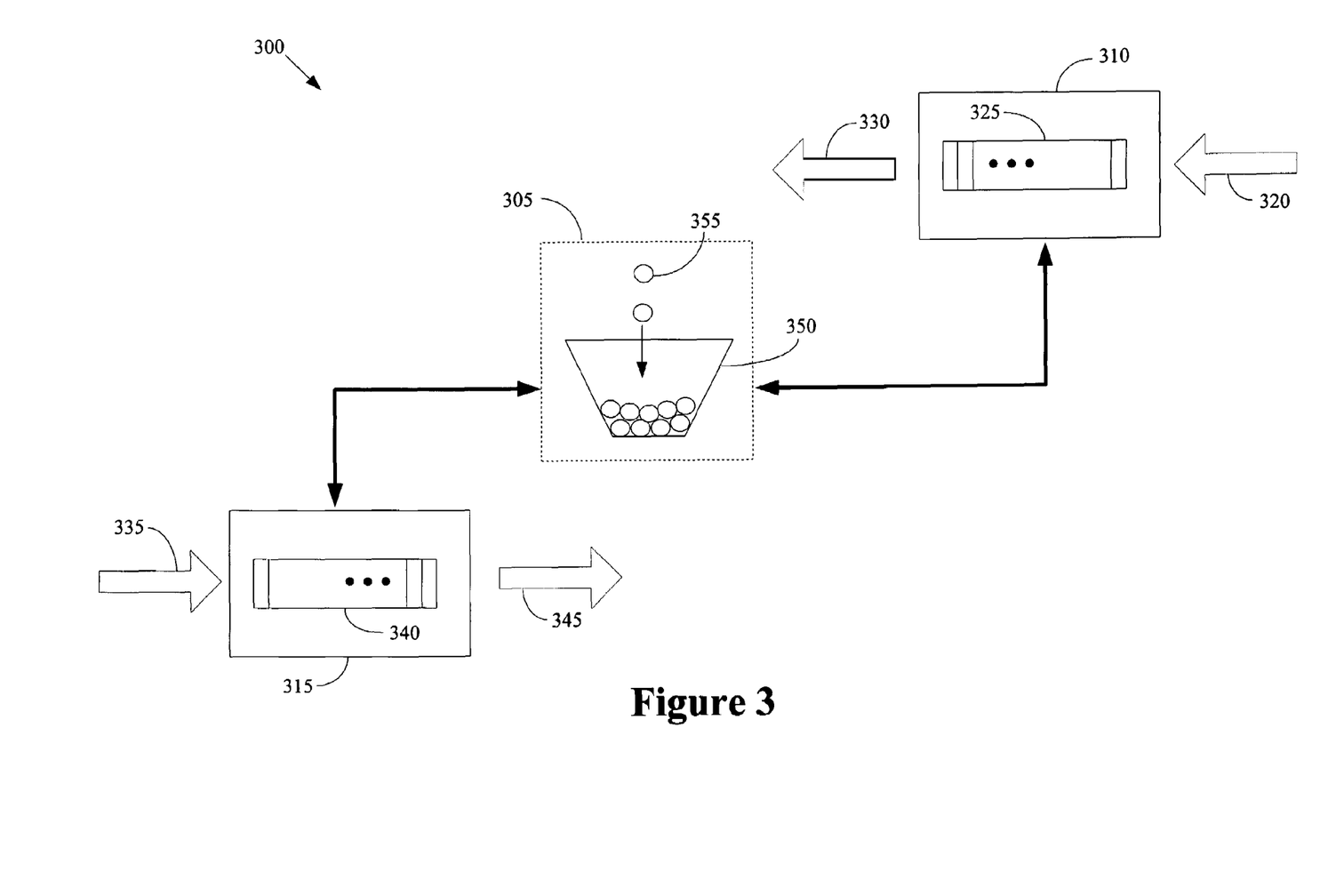
FIG. 3 conceptually illustrates one exemplary embodiment of a system for regulating upstream and downstream traffic streams, in accordance with the present invention.

FIG. 3 conceptually illustrates one exemplary embodiment of a system 300 for regulating upstream and downstream traffic streams. In the illustrated embodiment, the system 300 includes a grant server 305. The grant server 305 may be communicatively coupled to an upstream regulation system 310 and a downstream regulation system 315. The regulation systems 310, 315 may consist of a set of upstream and downstream information flows that together need to conform to a traffic contract. In one embodiment, the regulation systems 310, 315 can also be implemented in a device that sends and receives one or more traffic streams that together need to conform to a contract and may compete for access to a shared medium. Alternatively, a bundle of upstream and/or downstream connections, which may not necessarily terminate on the same device, or even the same network, may be regulated together. In another alternative embodiment, a regulation system 310, 315 may be a group of devices that together have a traffic contract that should not be violated. In the case of a shared medium, or a medium that can quickly change transmit capacity in the upstream and/or downstream directions, a contract in only the upstream direction (or fixed contracts in both directions) is either not sufficient and/or does not uses the available transmit capacity (of the contract) effectively.

The upstream regulation system 310 may receive data for transmission on the uplink (as indicated by the arrow 320). The received data may be stored in a queue 325 before being transmitted over the uplink (as indicated by the arrow 330). The downstream regulation system 315 may receive data for transmission on the downlink (as indicated by the arrow 335). The received data may be stored in a queue 340 before being transmitted over the uplink (as indicated by the arrow 345).

The grant server 305 functions as a server for the upstream and/or downstream regulation systems 310, 315 and may provide a grant that permits the regulation systems 310, 315 to send information explicitly. In the illustrated embodiment, the grant server 305 is depicted as including a bucket 350 that may be filled with tokens 355 (only one indicated in FIG. 3). Each token 355 represents a selected capacity. For example, a token 335 may represent a certain number of bits, bytes, or packets (e.g., for fixed packet sizes) that may be transmitted on the uplink and/or the downlink. In one embodiment, the tokens 355 may be provided to the bucket 350 at a fixed rate that is determined based on the negotiated traffic contract. For example, tokens 355 corresponding to a selected number of bytes may be provided at the end of a period of time, as indicated by a clock tick associated with the upstream and/or the downstream channel. As will be discussed in detail below, the grant server 305 may provide grants to the upstream and/or downstream regulation systems 310, 315 based on the tokens 355 available in the bucket 350. The regulation systems 310, 315 may not release information for transmission on the uplink and/or the downlink until the grant server 305 provides a grant that instructs one or more of the regulation systems 310, 315 to release the information.

Figure 4:
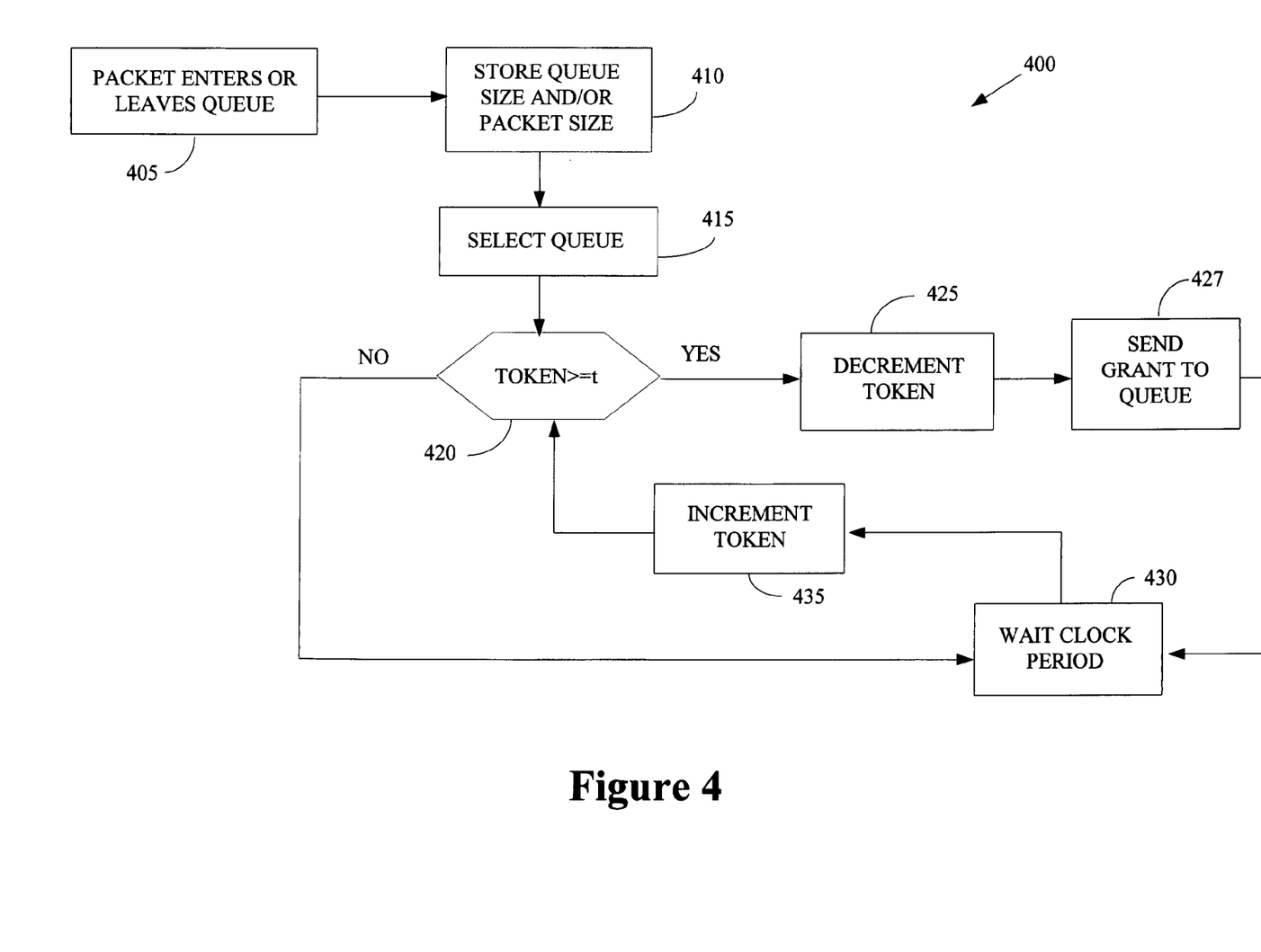
FIG. 4 conceptually illustrates one exemplary embodiment of a method for regulating upstream and/or downstream information flows, in accordance with the present invention.

FIG. 4 conceptually illustrates one exemplary embodiment of a method 400 for regulating upstream and/or downstream information flows. In the illustrated embodiment, the upstream and/or downstream information flows are regulated by a grant mechanism, such as the grant server 305 shown in FIG. 3, which is communicatively coupled to upstream and downstream regulation mechanisms, such as the upstream and downstream regulation systems 310, 315 shown in FIG. 3. The regulation systems may inform (at 405) the grant mechanism about their queue size and the information may be stored (at 410). For example, the regulation systems may provide (at 405) information indicating that a corresponding queue size has changed due to packets entering and/or leaving the queue. The queue size may be expressed in bytes, bits, or in packets in the case of fixed size packets. The grant mechanism may determine the requirements of each regulation system based on the provided (at 405) and/or stored (at 410) information. The grant mechanism may also use the provided (at 405) and/or stored (at 410) information to recover if information is lost.

If the queue sizes of one or more of the regulation systems are not zero, indicating that information is available to be transmitted, one of the regulation systems may be selected (at 415) to send information. In one embodiment, the regulation system may be selected randomly. Alternatively, the regulation system may be selected (at 415) according to a queueing discipline, based on the queue size, or some other criterion. For example, a regulation system may be selected (at 415) according to a weighted fair queueing discipline. Selecting (at 415) a regulation system using the aforementioned techniques may provide a way to provide priority in granting regulation systems the right to send information when temporary overload conditions occur. As a result, a grant of a size equal to the size of the packet waiting in front of the regulation system may be sent to the overloaded regulation system.

As discussed above, the grant mechanism may receive tokens that may be stored in a bucket. In the illustrated embodiment, the grant mechanism has one counter named TOKEN that keeps track of the number of bytes that can be sent simultaneously (e.g., as indicated by the received the tokens). The number of bytes that may be sent simultaneously may not exceed a configurable bucket limit (e.g., about 4000000 bytes). Tokens can be expressed in bytes, and leaky and/or token buckets may be implemented to allow usage of granular token sizes. When the grant mechanism receives the queue size and the size of the packet in front of the regulation system information, the grant mechanism studies the requirements of all regulation systems and TOKEN. If the grant mechanism determines (at 420) that TOKEN is larger than the packet (the packet size being indicated by the variable t) in front of the regulation system, TOKEN is decremented (at 425) by the size of the packet, a grant is sent (at 427) to a selected regulation system, and the queue information (size first packet and the queue size) is set to zero.

The grant mechanism may then wait (at 430) until the end of the current clock period, which may be indicated by a clock tick. At the end of the current clock period, the TOKEN may be incremented (at 435). For example, at each clock tick associated with the outgoing medium, TOKEN may be incremented (at 435) by a number of bytes that corresponds with a leak rate for a single clock tick. In one embodiment, the leak rate may represent the maximum transmission rate in overload situations.

If the grant mechanism determines (at 420) that TOKEN is lower than the size of the packet waiting for transmission (as indicated by the variable t), no grant is issued and the grant mechanism waits (at 430) an additional clock period. At the end of the current clock period, the TOKEN may be incremented (at 435), as discussed above, and the grant mechanism may again determine (at 420) whether TOKEN is lower than the size of the packet waiting for transmission (as indicated by the variable t). Accordingly, the grant mechanism may continue to wait until TOKEN reaches the size of packet size waiting in front of the selected regulation system. In some embodiments, the upstream and/or downstream regulation systems may not have a queue. In these embodiments, the queue size may be interpreted as being equal to the size of the packet just received and if no grant is received immediately, the regulation system may delete the packet. Higher communication layers may decide to re-send the packet or not.

If the grant mechanism does not know the size of the packet waiting in front of a regulation system, but the queue size in the regulation system is larger than zero, the grant mechanism may set the value of the queue size to a predefined maximum M. The maximum M defines the maximum packet size that can occur. The maximum value can be overwritten as soon as the exact value becomes known. If a regulation system receives a grant that is larger than the first packet, it simply ignores the surplus capacity. Each time a regulation system receives a grant, it simply sends the first waiting packet and does not need to check whether the grant is sufficient. Grants that do not correspond with the size of the first packet only occur if an error occurred. By setting the default value, the mechanism can recover from such an error. If the channel rates in the upstream and downstream directions differ, a ration factor can be used to determine if TOKEN is large enough and to decrease TOKEN properly.

Figure 5A:
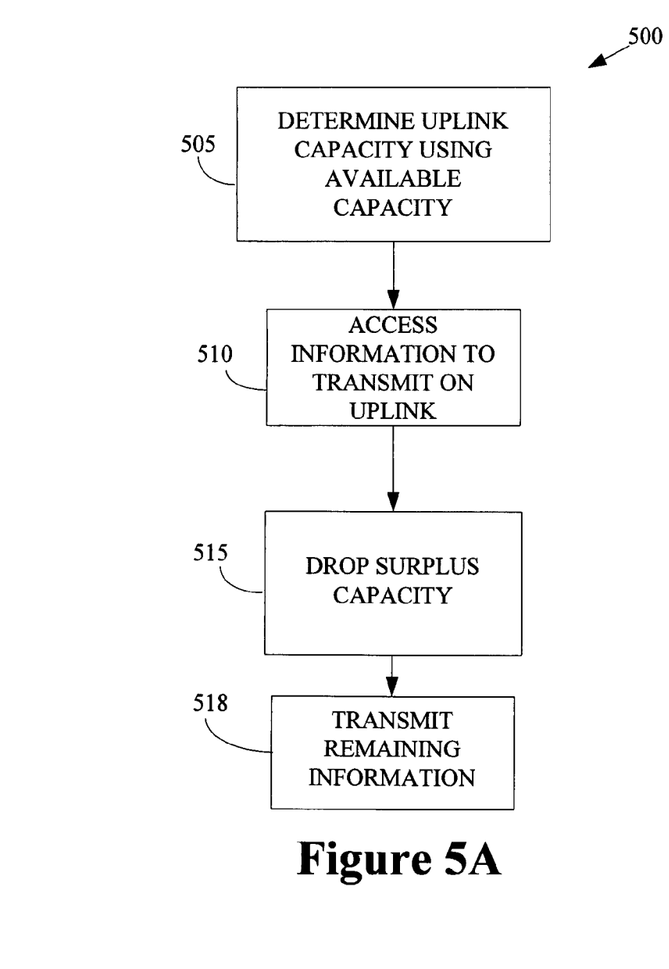
FIG. 5A conceptually illustrates a method for policing traffic based on an uplink capacity that is determined using an available capacity, in accordance with the present invention.

FIG. 5A conceptually illustrates a method 500 for policing traffic based on an uplink capacity that is determined using an available capacity. In the illustrated embodiment, an uplink capacity is determined (at 505) based on an available capacity. For example, the uplink capacity may be determined (at 505) based on the negotiated total capacity of an air interface and the capacity of an associated downlink channel, as discussed in detail above. In one embodiment, the uplink capacity may also be determined (at 505) based upon a minimum uplink capacity and/or a maximum uplink capacity.

Information to be transmitted over the uplink may be accessed (at 510). For example, a network may provide information to an access point, and the access point may access (at 510) the information so that it may be transmitted to an access terminal. Surplus capacity of the information may be dropped (at 515) if the capacity needed to transmit the information exceeds the determined uplink capacity. For example, the capacity of all the information available for transmission may exceed the determined uplink capacity. The difference between the capacity needed to transmit the available information and the determined uplink capacity (e.g., the surplus capacity) may be dropped (at 515). The remaining portion of the available information may then be transmitted (at 518) over the uplink at less than or approximately the determined uplink capacity. Thus, responsibility for maintaining the negotiated capacities resides with the transmitting device.

Figure 5B:
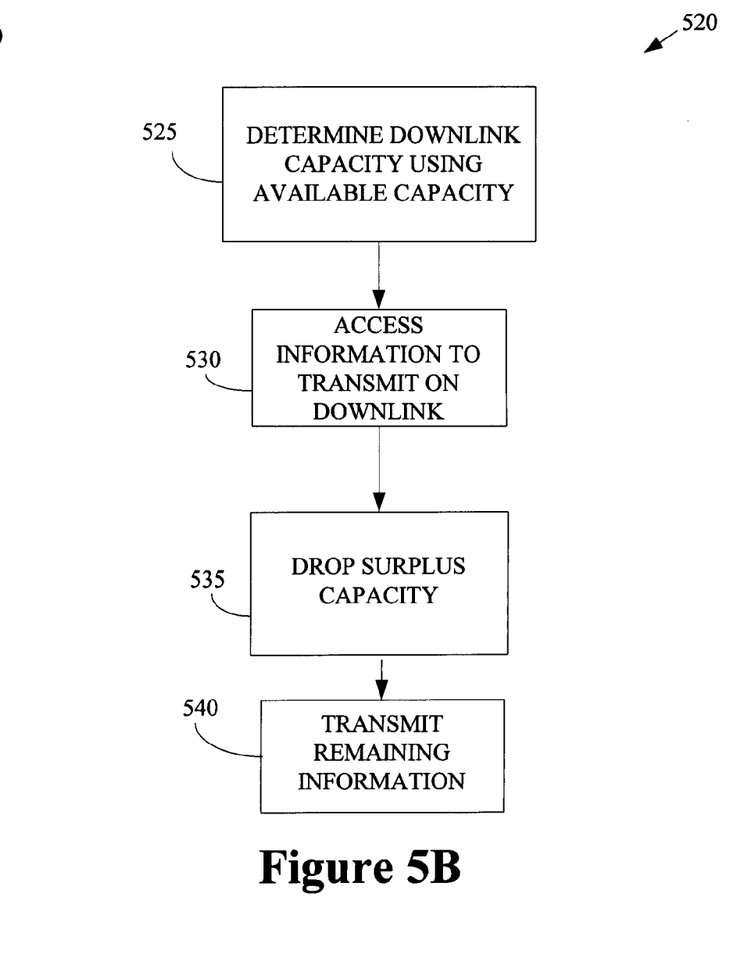
FIG. 5B conceptually illustrates a method for policing traffic based on a downlink capacity that is determined using an available capacity, in accordance with the present invention.

FIG. 5B conceptually illustrates a method 520 for policing traffic based on a downlink capacity that is determined using an available capacity. In the illustrated embodiment, a downlink capacity is determined (at 525) based on an available capacity. For example, the downlink capacity may be determined (at 525) based on the difference between a negotiated total capacity of an air interface and a measured capacity of an associated uplink channel, as discussed in detail above. In one embodiment, the downlink capacity may also be determined (at 525) based upon a minimum downlink capacity and/or a maximum downlink capacity.

Information for transmission over the downlink may then be accessed (at 530). For example, an access terminal may access (at 510) information that is to be transmitted to the access point. Surplus capacity of the transmitted information may then be dropped (at 535). For example, the capacity needed to transmit all available information over the downlink may exceed the determined downlink capacity. The difference between the capacity needed to transmit all available information over the downlink and the determined downlink capacity (e.g., the surplus capacity) may be dropped (at 535). The remaining portion of the available information may then be transmitted (at 540) over the downlink at approximately the determined downlink capacity. Thus, responsibility for maintaining the negotiated capacities resides with the transmitting device.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for use in communication involving first and second parties, comprising:
   determining, by a grant server configured to allocate channel capacities, a first capacity associated with a first channel of a communication link between the first and second parties, the first channel being either an uplink or a downlink channel;
   negotiating, between the first and second parties, a maximum capacity allocated to the communication link; and
   assigning a second capacity to a second channel of the communication link, the second channel providing communication in the opposite direction to the first channel, and the second capacity being assigned based on the first capacity and the maximum capacity allocated to the communication link such that the sum of the first and second capacities does not exceed the maximum capacity.

2. The method of claim 1, wherein negotiating the maximum capacity comprises negotiating, between the first and second parties, contractual maximum capacity associated with said at least one uplink channel and said at least one downlink channel of the communication link.

3. The method of claim 1, wherein the first channel comprises an uplink channel, and wherein determining the first capacity comprises measuring an uplink capacity associated with the uplink channel.

4. The method of claim 3, comprising determining at least one of a minimum uplink capacity and a maximum uplink capacity associated with the uplink channel.

5. The method of claim 4, wherein assigning the second capacity comprises assigning a downlink capacity based on the maximum capacity and at least one of the measured uplink capacity, the minimum uplink capacity, and the maximum uplink capacity.

6. The method of claim 1, wherein the first channel comprises a downlink channel, and wherein determining the first capacity comprises measuring a downlink capacity associated with the downlink channel.

7. The method of claim 6, comprising determining at least one of a minimum downlink capacity and a maximum downlink capacity associated with the downlink channel.

8. The method of claim 7, wherein assigning the second capacity comprises assigning an uplink capacity based on the maximum capacity and at least one of the measured downlink capacity, the minimum downlink capacity, and the maximum downlink capacity.

9. The method of claim 1, wherein assigning the second capacity comprises assigning the second capacity based on at least one of a number of users, a current load, a traffic shape, and a statistical multiplexing of traffic streams of different users.

10. The method of claim 1, wherein assigning the second capacity comprises assigning the second capacity at a predetermined interval.

11. The method of claim 1, wherein assigning the second capacity comprises assigning the second capacity such that the second capacity is less than or equal to the difference between the maximum capacity and the first capacity.

12. A method for use in communication involving first and second parties, comprising:
  determining, by a transmitting device configured to transmit information over an uplink channel of a communication link between said first and second parties a first capacity of the uplink channel of the communication link between the first and second parties based on a second capacity associated with a downlink channel of the communication link and an available capacity allocated to the communication link such that the sum of the first and second capacities does not exceed the available capacity;
  accessing information to be transmitted over the uplink channel at a fourth capacity; and
  dropping a portion of the accessed information if the fourth capacity exceeds the first capacity.

13. The method of claim 12, wherein determining the first capacity comprises determining the first capacity such that the first capacity is less than or approximately equal to the difference between the available capacity and the second capacity associated with the downlink channel of the communication link.

14. The method of claim 12, wherein determining the first capacity comprises determining the first capacity of the uplink based on at least one of a minimum uplink capacity, a maximum uplink capacity, a number of users, a current load, a traffic shape, and a statistical multiplexing of traffic streams of different users.

15. The method of claim 12, comprising transmitting a remaining portion of the accessed information over the uplink at approximately the first capacity.

16. A method for use in communication involving first and second parties, comprising:
  determining, by a transmitting device configured to transmit information over a downlink channel of a communication link between said first and second parties a first capacity of the downlink channel of the communication link between the first and second parties based on a second capacity associated with an uplink channel of the communication link and an available capacity allocated to the communication link such that the sum of the first and second capacities does not exceed the available capacity;
  accessing information to be transmitted over the downlink channel at a fourth capacity; and
  dropping a portion of the accessed information if the fourth capacity exceeds the first capacity.

17. The method of claim 16, wherein determining the first capacity comprises determining the first capacity such that the first capacity is less than or approximately equal to the difference between the available capacity and the second capacity associated with the uplink channel of the communication link.

18. The method of claim 16, wherein determining the first capacity of the downlink comprises determining the first capacity of the downlink based on at least one of a minimum downlink capacity, a maximum downlink capacity, a number of users, a current load, a traffic shape, and a statistical multiplexing of traffic streams of different users.

19. The method of claim 16, comprising transmitting a remaining portion of the accessed information over the downlink at approximately the first capacity.

* * * * *

UNITED STATES PATENT AND TRADEMARK OFFICE
CERTIFICATE OF CORRECTION

PATENT NO. : 7,653,396 B2
APPLICATION NO. : 11/204194
DATED : January 26, 2010
INVENTOR(S) : van der Gaast et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Twenty-eighth Day of December, 2010

David J. Kappos
*Director of the United States Patent and Trademark Office*